United States Patent [19]

Robertson, deceased et al.

[11] Patent Number: 4,814,623

[45] Date of Patent: Mar. 21, 1989

[54] PULSED NEUTRON DETECTOR

[75] Inventors: J. Craig Robertson, deceased, late of Albuquerque, N. Mex., by Moira M. Robertson, heir; Mark S. Rowland, Livermore, Calif.

[73] Assignee: University of New Mexico, Albuquerque, N. Mex.

[21] Appl. No.: 41,062

[22] Filed: Apr. 22, 1987

Related U.S. Application Data

[63] Continuation-in-part of Ser. No. 732,470, May 8, 1985, abandoned.

[51] Int. Cl.$^4$ .............................................. G01T 3/06
[52] U.S. Cl. ............................ 250/390.11; 250/392; 250/390.01
[58] Field of Search ................ 250/390 J, 392, 390 R

[56] References Cited

U.S. PATENT DOCUMENTS 2,245,787  6/1941  Kallmann et al. ............... 250/475.2

Primary Examiner—Carolyn E. Fields
Attorney, Agent, or Firm—Albert Sopp

[57] ABSTRACT

A pulsed neutron detector and system for detecting low intensity fast neutron pulses has a body of beryllium adjacent a body of hydrogenous material the latter of which acts as a beta particle detector, scintillator, and moderator. The fast neutrons (defined as having $En > 1.5$ MeV) react in the beryllium and the hydrogenous material to produce larger numbers of slow neutrons than would be generated in the beryllium itself and which in the beryllium generate helium-6 which decays and yields beta particles. The beta particles reach the hydrogenous material which scintillates to yield light of intensity related to the number of fast neutrons. A photomultiplier adjacent the hydrogenous material (scintillator) senses the light emission from the scintillator. Utilization means, such as a summing device, sums the pulses from the photo-multiplier for monitoring or other purposes.

12 Claims, 3 Drawing Sheets

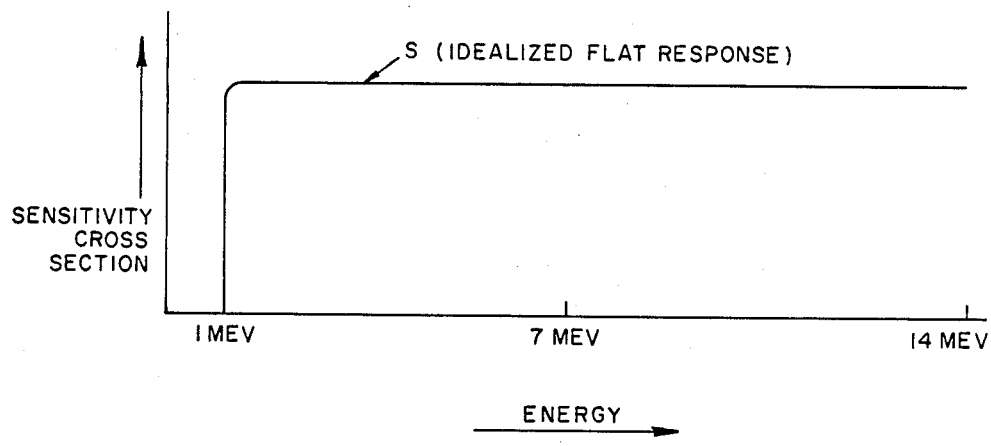
FIG—1A
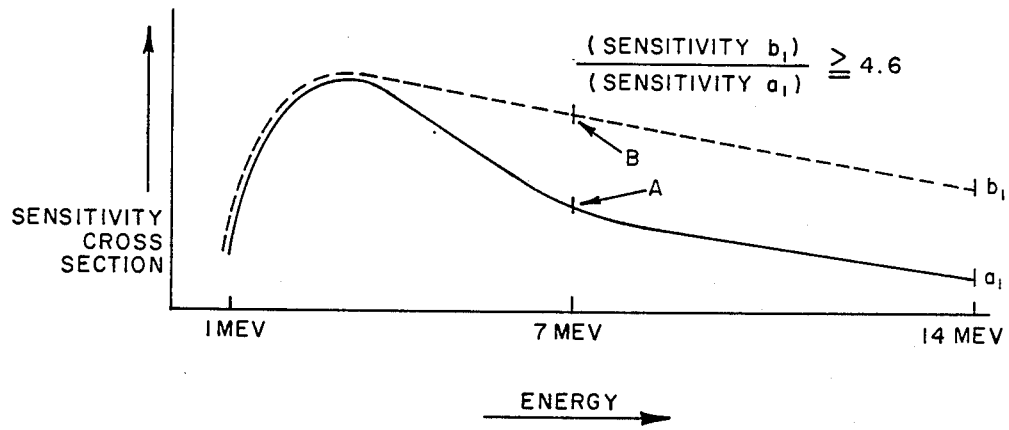
FIG—1B

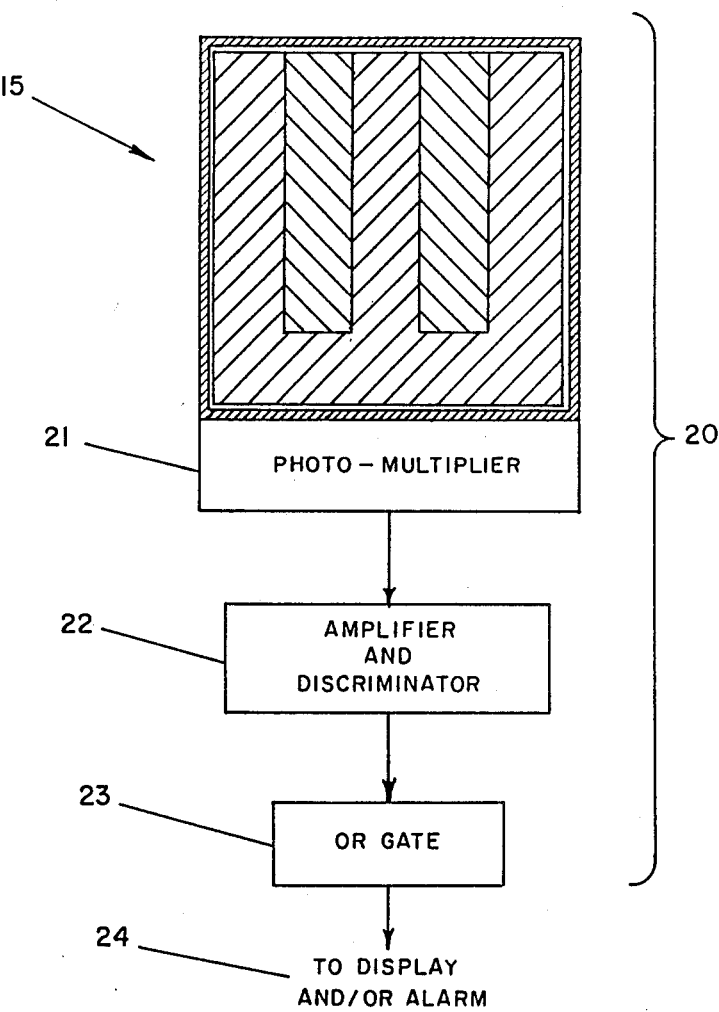
FIG — 3

PULSED NEUTRON DETECTOR

BACKGROUND OF THE INVENTION

This invention was made in the course of or under a contract with the United States Department of Energy.

This invention is a continuation-in-part of patent application Ser. No. 732,470 filed May 8, 1985, now abandoned.

The present invention relates to neutron detection and more particularly to fast neutron (En>1.5 MeV) detection within a short period from a pulsed neutron source.

At present a commonly used system for detecting neutrons is a lead counter described in the article "A Fast-Neutron Activation Detector for 14-MeV pulsed Neutron Sources" by Ruby and Rechen and appearing in *Nuclear Instruments and Methods* 15 (1962) 74. The lead counter is quite bulky and is difficult to calibrate. Also the lead counter is sensitive to slow neutrons (e.g., scattered neutron (thermal) background) and thus lacks the desired sensitivity to fast neutrons.

Another popular method of neutron detection is through the simple activation of copper. The copper method is suitable in situations involving high yield ($10^8$) sources with high energies. This significantly limits the uses of copper to very few applications. Also, the uses of copper result in resonance reactions which might render copper difficult to use.

Still another method to detect fast neutrons was described by Howell in his article "A Highly Energy-Sensitive Activation Detector For Pulsed Fusion Neutron Sources" appearing in *Nuclear Instruments and Methods* 148 (1978) 39. This method utilizes the O-16(n,p)N-16 reaction. This method, though, is extremely difficult to calibrate due to resonances in the reactions, and lacks desired sensitivity.

Yet another method is the F-19(n,alpha)N-16 reaction described by Wolf and Moreh in their article entitled "Utilization of Teflon-Covered Ge(Li) Diodes for Fast Neutron Detection" appearing in *Nuclear Instruments and Methods* 148 (1978) 195. This method suffers from the same limitations of the O-16 method of Howell in that the device lacks sensitivity in the desired range and is extremely difficult to calibrate due to resonances in the reactions.

A neutron counter utilizing silver is another approach toward neutron detection. The basic principles are explained by Lanter and Bannerman in their article entitled "Silver Counter for Bursts of Neutrons" appearing in *Rev. Sci. Instr.* 39 (1968) 1588. A modification to this system was described in "Neutron Diagnostics for Pulsed High-Density Thermonuclear Plasmas" by Ekdahl appearing in *Rev. Sci. Instr.* 50 (1979) 941. The silver counters, like the lead types, use heavy metals involving non-threshold reactions with neutrons and thus are very sensitive to thermal neutron backgrounds. Furthermore, their efficiency is very sensitive to the timing intervals used.

It is apparent from the foregoing that a fast neutron detector is needed which is highly sensitive to fast neutrons from pulsed neutron sources including sources where the total neutron flux is low, allows measurement of D—D yields (En>1.5 MeV), is effectively insensitive to thermal or slow neutron backgrounds, provides a reliable pulsed beam counting ability, and provides sufficient neutron reactions to insure high sensitivity in the desired range.

DESCRIPTION OF THE INVENTION

The invention utilizes an optimum arrangement of selected materials which interact with fast neutrons to produce a high concentration of beta particles within a short (e.g., less than ½ second) time period such that the resulting signal representing the total number of neutrons based on the number of beta particles detected within the time period has a high signal-to-noise (S/N) and signal-to-background (S/B) ratio. These signal-to-noise and signal-to-background ratios are higher than might otherwise be expected because of the mutually assistive interactions of neutrons in the two adjacent bodies of material which receive fast neutrons. The first of these bodies is a slab of beryllium (Be) and the second is an adjacent slab of hydrogenous material such as an organic compound containing substantial amounts of hydrogen ($H_2$). This hydrogenous material also functions as a scintillator. The adjacent slabs of beryllium and organic compound interact with fast neutrons to produce slower neutrons which interact to enhance beta particle production. The beta particles provide energy for producing scintillation signal suitable for amplification and summation. The resultant sensitivity of the system according to the invention is less dependent upon the energy levels of the incoming neutrons than would be provided by the beryllium alone.

The energy-independent higher sensitivity resulting from higher overall signal-to-noise and signal-to-background ratio occurs in accordance with the invention as follows. The fast neutrons having energies above approximately 1.5 MeV generated by a pulsed source of less than 500 milliseconds or so duration react with the beryllium to produce helium 6 (He-6) which has an extremely short half-life of about 800 milliseconds. The helium 6 decays into lithium (Li-6) and a beta particle. The beryllium atoms are light, of course, and, unlike atoms of copper, silver, lead, oxygen, or other heavier elements, reduce, through scattering collisions with incoming fast neutrons, the neutrons' energy levels and speed at a faster rate. This action produces slower neutrons (but with energies above approximately 1.5 MeV), thereby increasing the probability of collisions between the slower neutrons and other beryllium atoms. This results in a greater number of He-6 decays and beta particles for a given number of incipient, fast neutrons during a pulse period. The beta particles have an end-point energy of about 3.5 MeV.

Some fast neutrons pass into the beryllium and some slower neutrons produced by the scattering collisions with the beryllium penetrate into the adjacent slab of hydrogenous organic material and collide primarily with the H2 therein. This also produces added numbers of slower neutrons. Thus, even further numbers of slower neutrons with energies above about 1.5 MeV are produced some of which return to the beryllium slab to generate yet greater amounts to He6 and beta particles. The result is production of a much larger number of beta particles than the original number of fast neutrons would be expected to produce from their reaction with beryllium alone. This large number of beta particles produced in the relatively short period of ond-half life of decay of the He-6 produces photons in the hydrogenous material which are suitably detected, amplified, and summed, whereby the resulting signal has a high S/N ratio and S/B ratio with virtually no noise from low energy level neutrons and is substantially independent of the energy levels of the incipient fast neutrons. Because of these effects, the beryllium detector of the invention has a much higher sensitivity per unit volume than other counters.

BRIEF DESCRIPTION OF THE DRAWINGS

For a better understanding of the invention, reference may be made to the accompanying drawings depicting embodiments of the invention, wherein like reference numerals refer to like parts and in which FIG. 1.A is a sensitivity response curve of fast neutron energies versus effective sensor cross section showing flat response under idealized, hypothetical conditions;

FIG. 1.B is a sensitivity response curve of fast neutron energies versus effective sensor cross section in accordance with an embodiment of the invention;

DETAILED DESCRIPTION OF THE INVENTION

Referring to FIG. 1.A which shows energy levels in MeV versus cross section sensitivity response, curve S illustrates the shape that hypothetically would be achieved in the ideal world wherein the cross section activity response of the material impacted by the fast neutrons is flat above a given energy threshold. Certainly, the flat response would be highly desirable so that the total count of neutrons could be accurate regardless of the inevitable variations in energy levels among incoming neutrons. Also, the magnitude of sensitivity would be large enough to enable detection of weak sources of fast neutrons.

FIG. 1.B shows in the solid line A the shape of an actual sensitivity response curve of a cross section of beryllium as a function of its interaction with neutrons at various energy levels above a given threshold of approximately 1–1.5 MeV. The response curve A corresponds to the probability of creating He6 and, thus, beta particles from beryllium alone. Note that as the energy level increases, sensitivity decreases. This is to be expected, of course, because of lower numbers of collisions between higher energy, faster neutrons and the beryllium. Slower neutrons have more collisions.

Broken line B in FIG. 1.B shows what happens as the result of employing the arrangement in accordance with the present invention, wherein hydrogenous material is advantageously combined with the beryllium to react with neutrons. Because of the scattering interactions with neutrons in both the beryllium and hydrogenous material, the effect of which is to lower neutron energy, large numbers of slower neutrons are generated. For example, a typical scatter of a neutron reaction with hydrogen at $E_{in}=14$ MeV yields a $E_{out}$ approximately $=7$ MeV which is in an area of higher collision probability and, thus, sensitivity. With heavier elements, $E_{out}$ is 11 MeV or higher. Consequently, greater amounts of He6 and beta particles are produced for a given number of fast neutrons than would be expected from their interaction with a heavier element or with just beryllium at higher incipient neutron energy levels. Thus, in the arrangement according to the invention, response curve B is more level than A (by a factor of about 5) and resembles more closely the idealized, desirable flat response curve shown in FIG. 1.A. Also, the sensitivity in the arrangement according to the invention at 14 MeV, for example, is a factor of about 5 times higher than for just Be alone, illustrating the mutually assistive interaction of the bodies of beryllium and hydrogenous material to produce large numbers of beta particles.

Figure 2A:
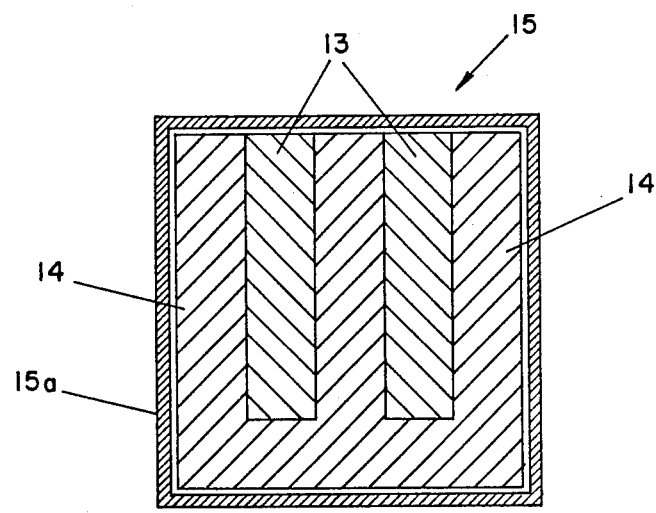
FIGS. 2.A and 2.B are illustrations of respective embodiments of the invention, and FIG. 3. is a schematic block diagram of a fast neutron detection system according to the invention.
Figure 2B:
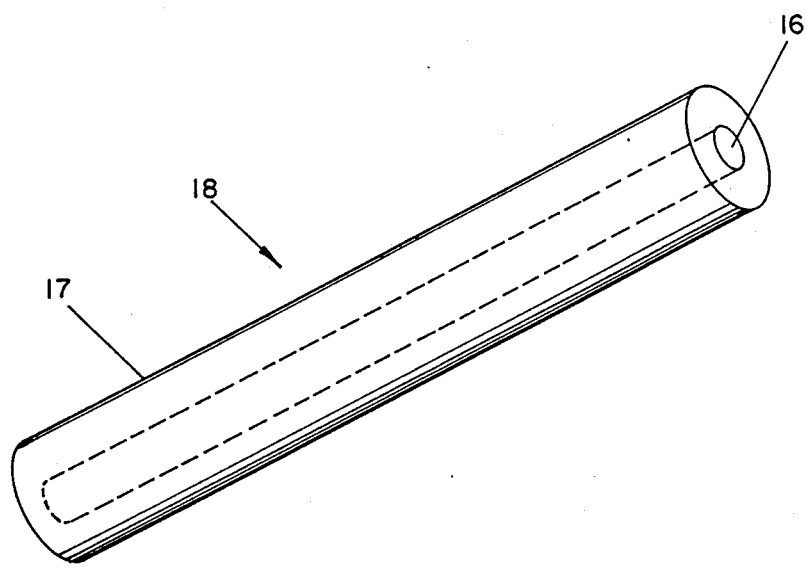

Referring to FIG. 2.A, there is shown an embodiment of the invention wherein two slabs 13 of beryllium each of which are about ¼ of an inch thick are sandwiched between 3 slabs 14 of equally thick hydrogenous material. The hydrogenous material is preferably BC-420, a commercially available substance manufactured by Bicron, Inc. The material, polyvinyltoluene, is composed of 52.361% $H_2$, 47.638% carbon, and 0.001% oxygen plus impurities, and is also known as a "plastic scintillator." Any suitable natural or synthetic hydrogenous material having scintillation properties may be used.

The approximately ¼ inch thickness for both bodies of the beryllium and hydrogenous material has been found to produce the optimum sensitivity. If the beryllium slab is much thinner than ¼ inch, say about ⅛ inch or less, the number of beryllium atoms available for production of He6 and beta particles becomes small in relation to the amount of incoming fast neutrons such that device sensitivity is reduced. If the beryllium slab is much thicker than ¼ inch, say above approximately ⅜ inch, then the beta particles encounter difficulty in escaping from the beryllium to cause scintillations in the neighboring slab of hydrogenous material. The approximately ¼ inch thickness maximizes escape or leakage of beta particles from the beryllium.

The optimum thickness for the hydrogenous material is also about ¼ inch with the preferred range of thickness being from about ⅛ inch to about ⅜ inch. The preferred range of thickness for the hydrogenous material is based on the range-energy characteristics of the material as a scintillator. If a plot is made of beta particle energies along an X-axis with 3.5 MeV as the end-point energy, and, along the Y-axis, the range of beta particles in the hydrogenous material, it is found that the optimum range occurs approximately mid-way at about 1.75 MeV in the energy spectrum. This optimum range occurs when the thickness of the hydrogenous material is about ¼ of an inch where said material is of the type BC-420 made by Bicron, Inc. Given the range-energy characteristics of other, similar hydrogenous materials, a similar plot can be made and correlation with the material thickness made. In general, the greater the concentration of electrons in the hydrogenous, scintillating material, the thinner it can be. Essentially, the ¼ inch thickness is appropriate for most hydrogenous scintillator materials and represents a suitable compromise between the material's capability to capture beta particles and to moderate neutrons.

As shown in FIG. 2.A., the beryllium slabs 13 can reside alongside of or be surrounded by the hydrogenous material 14. This is a convenient arrangement to afford positioning of a light-tight housing 15a of any suitable material and shape surrounding the resulting unit 15. For example, the housing may be made of aluminum having walls of thickness from about 0.01 mm to a maximum of about 2 mm. The thinner the walls of the housing, the better, so long as they are light-tight. Walls thicker than about 2 mm provide sufficient material for reaction with neutrons as to raise the external neutron reaction noise level to bothersome levels. Instead of a slab-type configuration, a cylindrical configuration shown in FIG. 2.B. may be employed. A cylindrical rod 16 of beryllium approximately ¼ inch in diameter is surrounded by a hollow cylinder 17 of hydrogenous organic material having a wall approximately ¼ inch thick to form the cylindrical unit 18. Unit 18 can be housed in a light-tight cylindrical receptacle (not shown) made of thin aluminum or any other suitable material.

As shown in FIGS. 2.A. and 2.B., the beryllium and hydrogenous material may be adjacent each other in close or intimate contact. The greater the degree of optical flatness of intimately contacting adjacent surfaces of the beryllium and hydrogenous material, the more efficient (i.e., higher sensitivity) is the system. The beryllium and hydrogenous material may be in intimate contact or have a small space between their surfaces of about 0.1 mm or less without serious degradation of performance. Larger gaps can be tolerated if the gap space is evacuated. A reflective coating of any suitable material such as titanium dioxide ($TiO_2$) may be provided on the outside surfaces of the hydrogenous material.

The system as a whole is shown in FIG. 3. in which the unit 15, for example, is optically coupled to a photomultiplier device 21 of any suitable design well-known in the art. The device 21 may be configured to surround the unit 15 is juxtaposition with the hydrogenous material. The photomultiplier senses the scintillations of the beta particles in the hydrogenous material 14. The output of the photomultiplier may be a digital or analog signal which may be further amplified in any suitable well-known amplifier/discriminator device 22. The discriminator portion of the device provides further noise reduction. An OR gate 23 or other suitable well-known means such as an integrator may be employed to measure or sum the signal. The signal may then be fed to any suitable utilization device or apparatus 24 such as, for example, a counter, ratemeter, alarm, or display. While the apparatus of the invention may be advantageously employed in any environment where neutron detection is necessary or desirable, it is of particular advantage in a health-physics environment such as cancer therapy where the total neutron flux may be quite low and yet it is important to know the neutron dosage. In this situation the detector of the invention is of great advantage due to its high sensitivity. The invention in one or more of its embodiments is of particular advantage for weak pulsed neutron sources of less than about 500 milliseconds pulse duration.

What is claimed is:

1. Apparatus for detecting low intensity fast neutron pulses above a minimum energy level of about 1.5 MeV comprising:
 a first body of material comprised of beryllium exposed to the neutrons and of thickness between approximately ⅛ inch and approximately ⅜ inch for generating in response to interaction with the neutrons substantial amounts of unstable helium-6 which decays to produce substantial numbers of beta particles;
 a second body of hydrogenous material of thickness predetermined by the range-energy characteristics of the material as a scintillator to optimize its capability to capture beta particles and to moderate the neutrons located in close proximity to said first body and exposed to the neutrons and said beta particles and capable of scintillation in response to said beta particles;
 the thicknesses of said first and second bodies of material being such that said bodies produce, through scattering interaction between the fast neutrons and the light atoms of both said materials, slower neutrons having higher probability of further collisions than the fast neutrons in the first body to thereby maximize the creation of helium-6 therein and thus, the number of beta particles produced in said first body for penetrating said second body to cause scintillation therein, the combined capability of the first and second bodies to produce helium-6 and resulting beta particles in the first body responsive to fast neutrons thus being substantially greater than the capability of said first body by itself to produce helium-6 and beta particles responsive to fast neutrons.

2. Apparatus according to claim 1 further comprising means to detect the scintillations produced in said second body.

3. Apparatus according to claim 1 wherein the thickness of said second body is of material such that its optimum thickness is at least approximately ⅛ inch to at most approximately ⅜ inch.

4. Apparatus according to claim 3 wherein the thickness of said second body in the useful direction of beta travel is at least approximately ⅛ inch to at most approximately ⅜ inch.

5. Apparatus according to claim 1 wherein the thickness of said second body is at least approximately ⅛ inch.

6. Apparatus according to claim 1 wherein the second body substantially surrounds said first body.

7. Apparatus according to claim 2 further comprising: means to shield said second body from ambient light.

8. Apparatus according to claim 1 further comprising: a coating of reflective material on said second body.

9. Apparatus according to claim 1 wherein adjacent surfaces of said first and second bodies are in intimate contact.

10. Apparatus according to claim 2 wherein said means to detect includes means to produce an alarm signal.

11. Apparatus according to claim 2 including means for producing a signal related to the number of scintillations over a predetermined period.

12. Apparatus according to claim 12 wherein the predetermined period is no greater than approximately ½ second.

* * * * *